March 1, 1949.  J. C. GUNN  2,462,957

SAUSAGE CASING TYING MACHINE

Filed Nov. 22, 1947  13 Sheets-Sheet 1

INVENTOR
Joel C. Gunn

ATTORNEYS

March 1, 1949.  J. C. GUNN  2,462,957
SAUSAGE CASING TYING MACHINE
Filed Nov. 22, 1947  13 Sheets-Sheet 2

INVENTOR
Joel C. Gunn
ATTORNEYS

March 1, 1949.  J. C. GUNN  2,462,957
SAUSAGE CASING TYING MACHINE
Filed Nov. 22, 1947  13 Sheets-Sheet 3
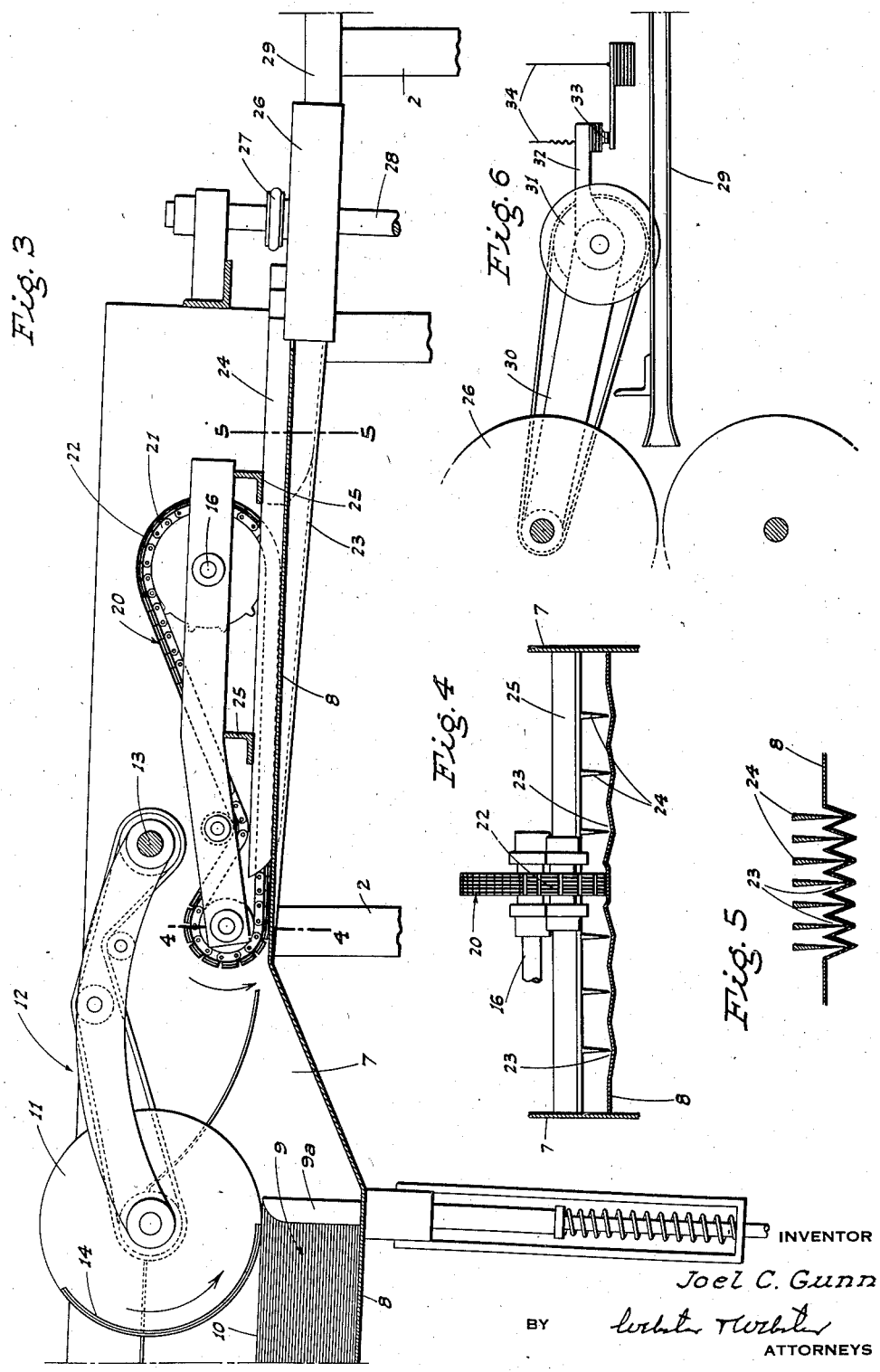
INVENTOR
Joel C. Gunn
BY
ATTORNEYS

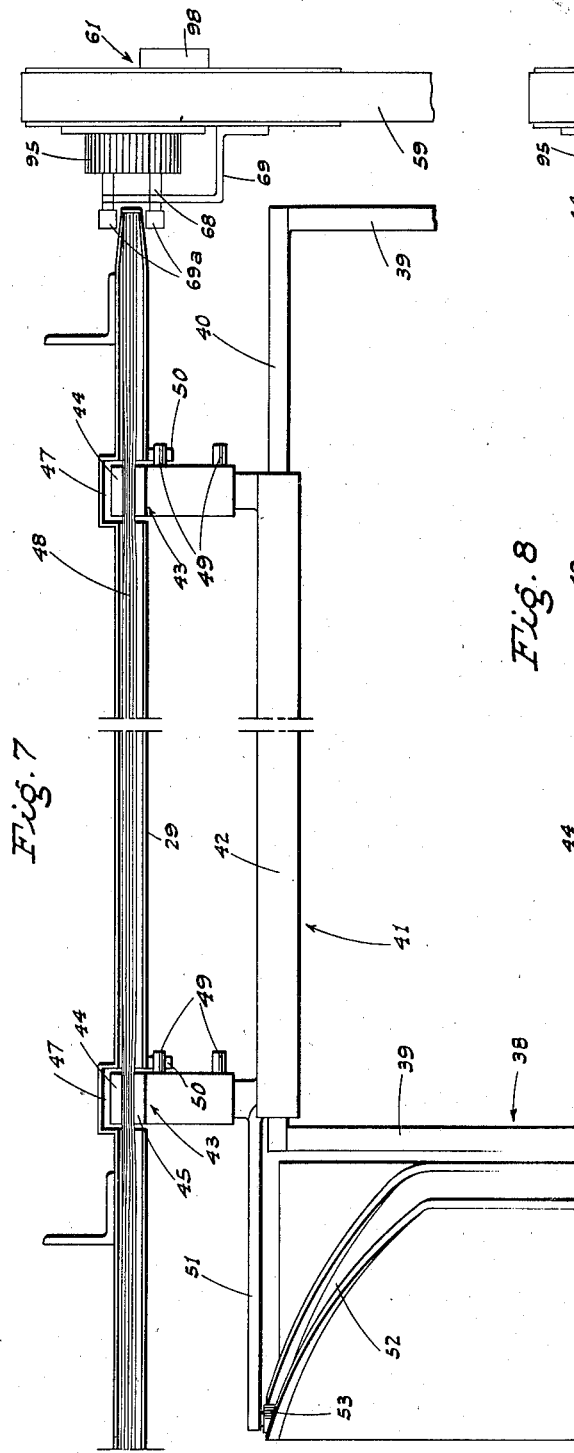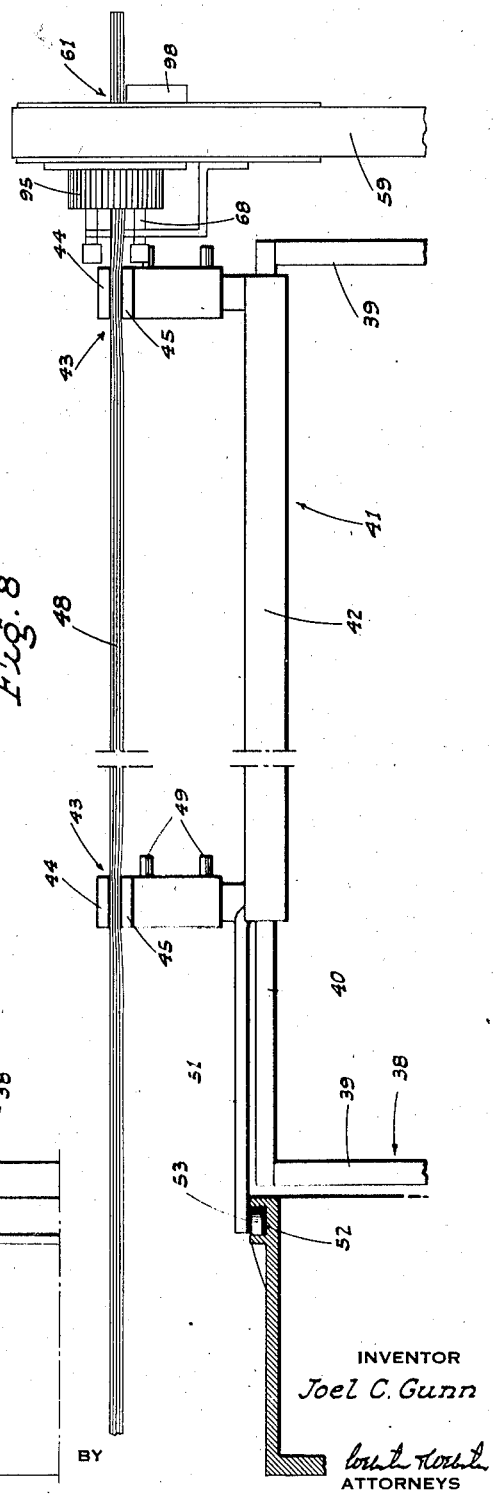

March 1, 1949.  J. C. GUNN  2,462,957
SAUSAGE CASING TYING MACHINE
Filed Nov. 22, 1947  13 Sheets-Sheet 5

INVENTOR
Joel C. Gunn
BY
ATTORNEYS

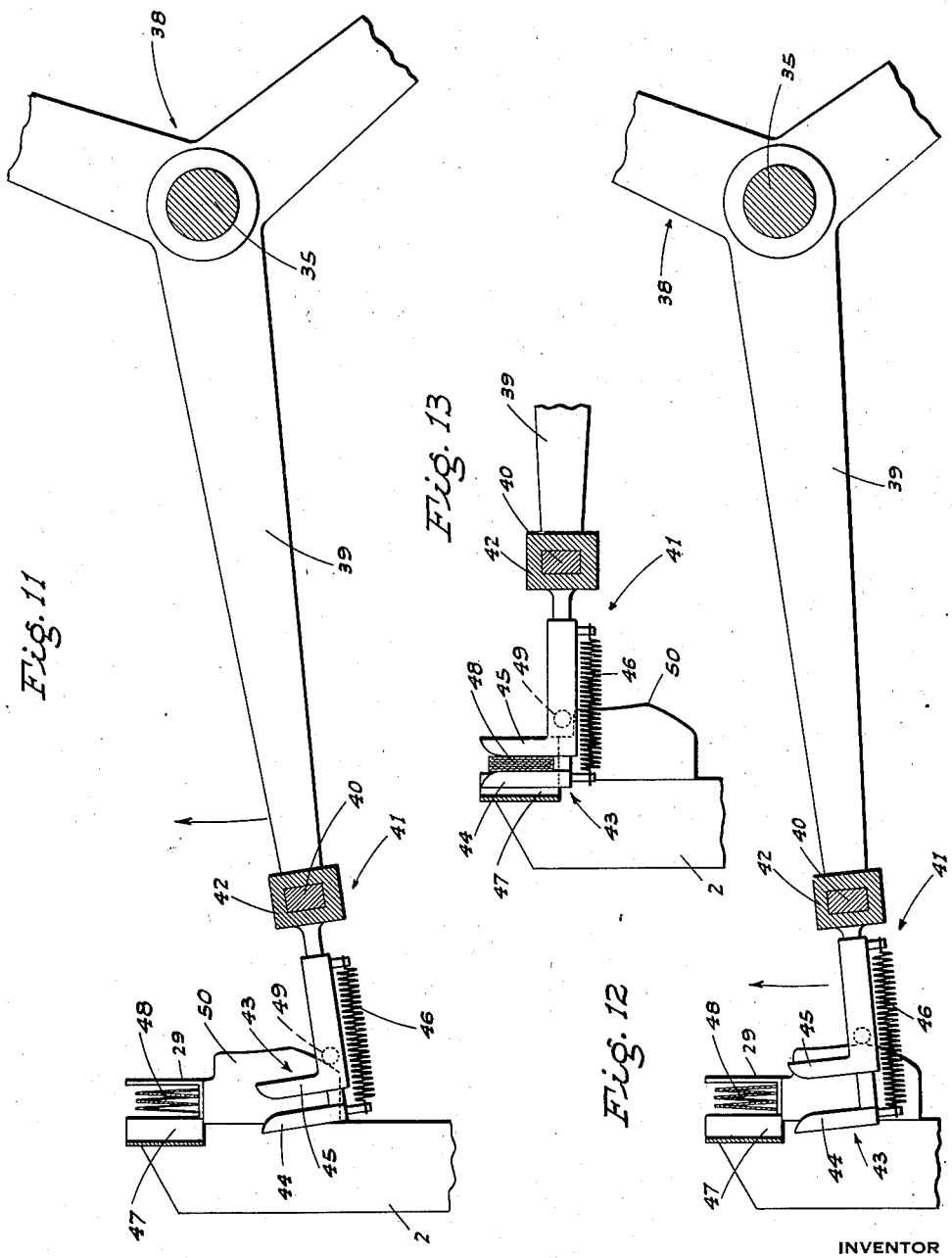

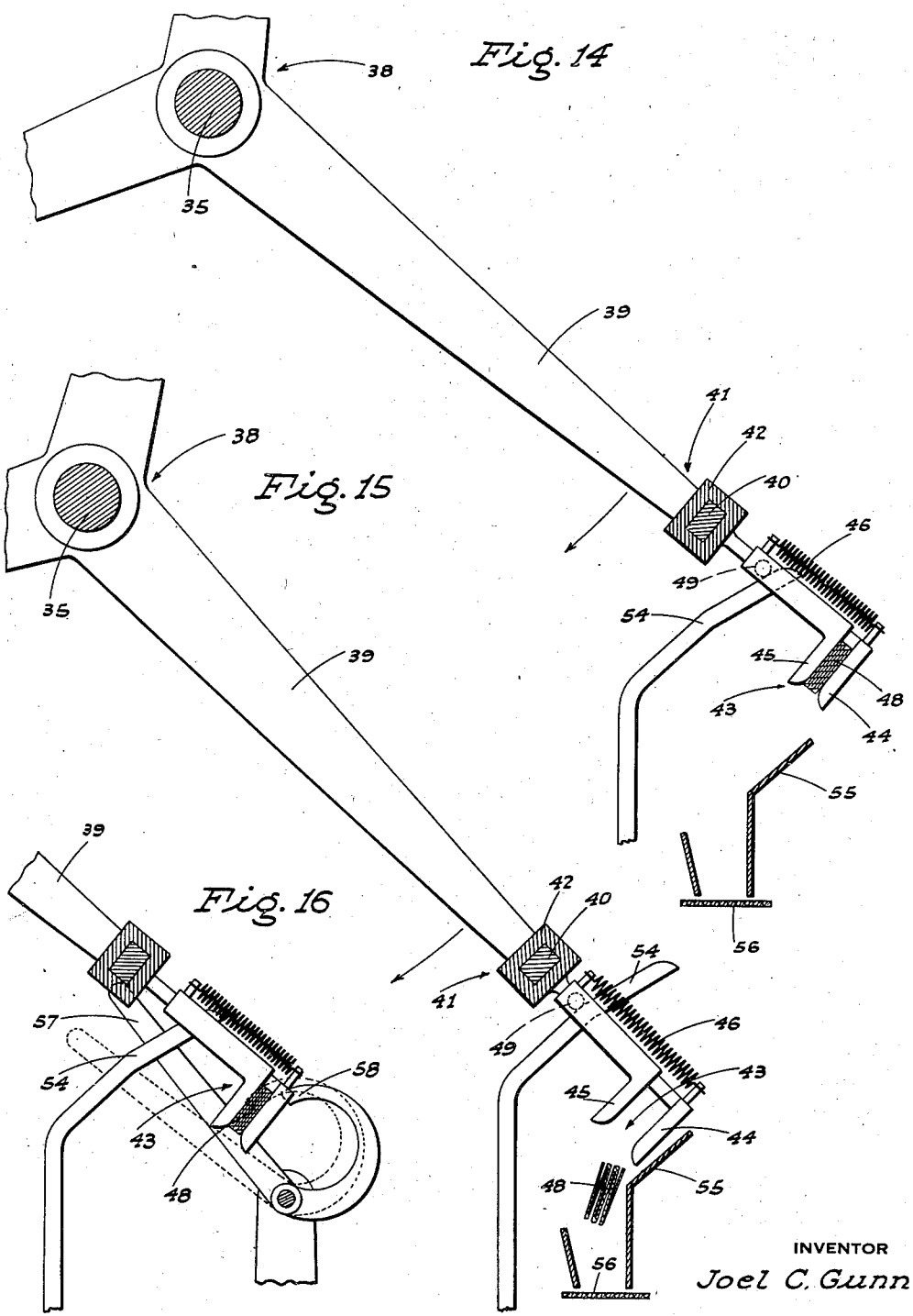

March 1, 1949.  J. C. GUNN  2,462,957
SAUSAGE CASING TYING MACHINE
Filed Nov. 22, 1947  13 Sheets-Sheet 8

INVENTOR
Joel C. Gunn
BY
ATTORNEYS

March 1, 1949.  J. C. GUNN  2,462,957
SAUSAGE CASING TYING MACHINE
Filed Nov. 22, 1947  13 Sheets-Sheet 9
Fig. 20
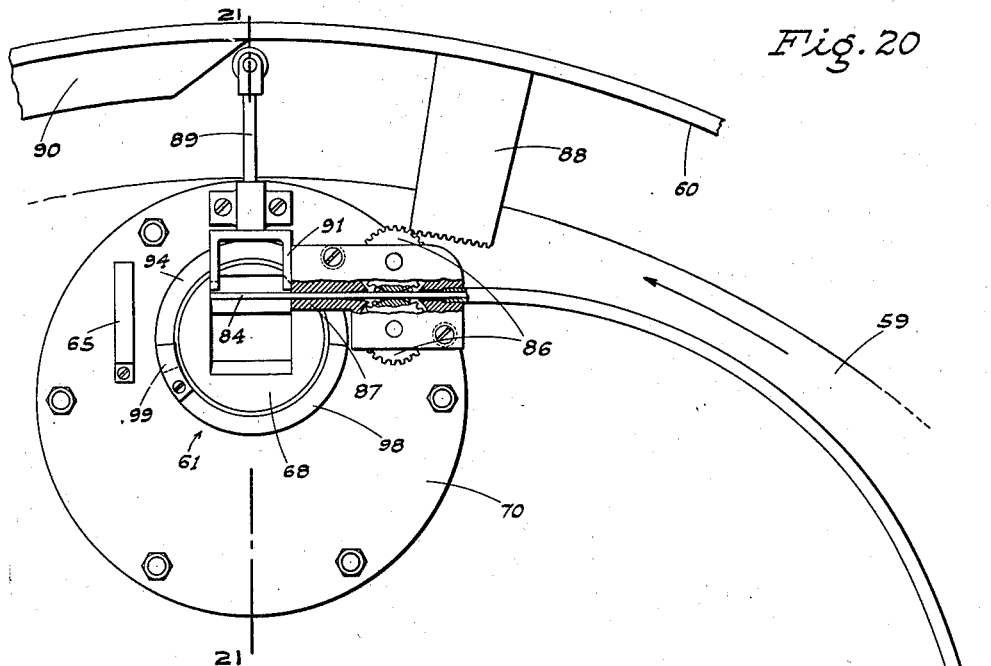
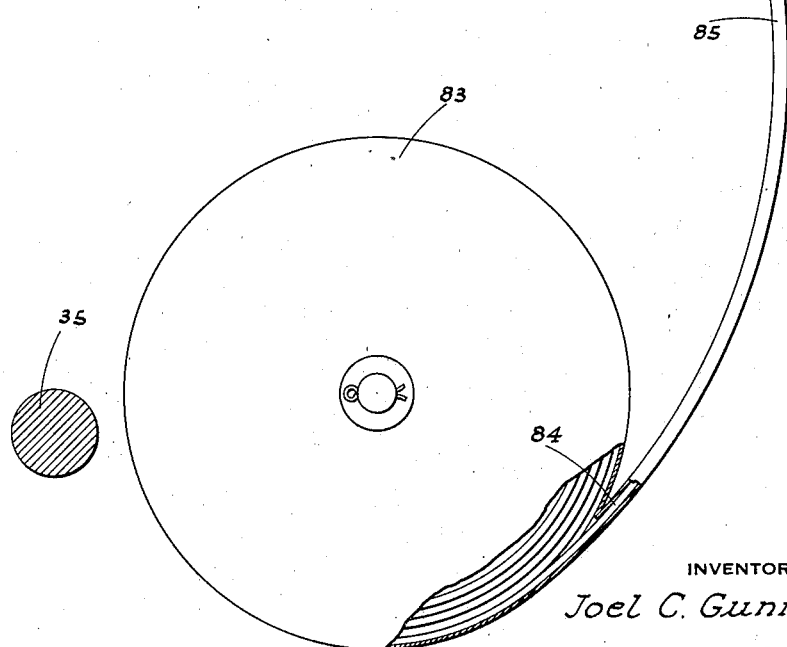
INVENTOR
Joel C. Gunn
BY
ATTORNEYS March 1, 1949.  J. C. GUNN  2,462,957
SAUSAGE CASING TYING MACHINE
Filed Nov. 22, 1947  13 Sheets-Sheet 10

INVENTOR
Joel C. Gunn
BY
ATTORNEYS

March 1, 1949. J. C. GUNN 2,462,957
SAUSAGE CASING TYING MACHINE
Filed Nov. 22, 1947 13 Sheets-Sheet 11
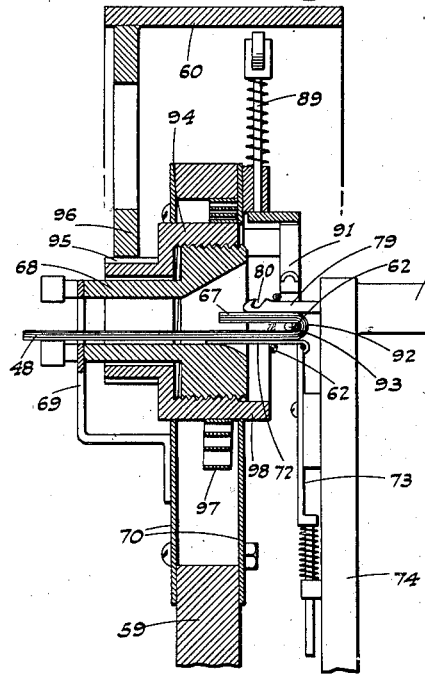
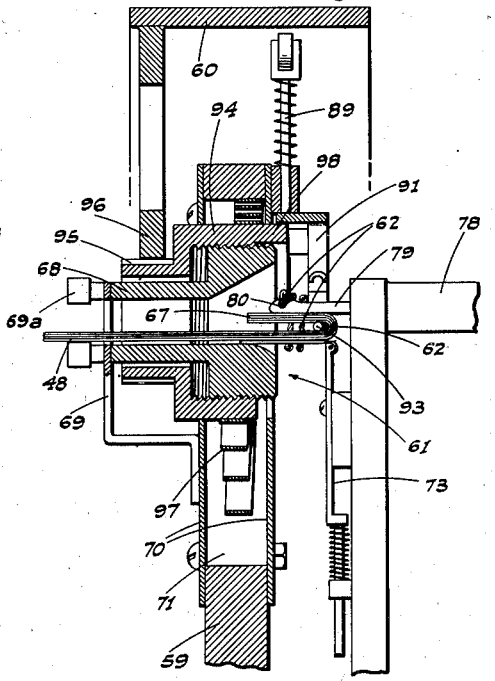
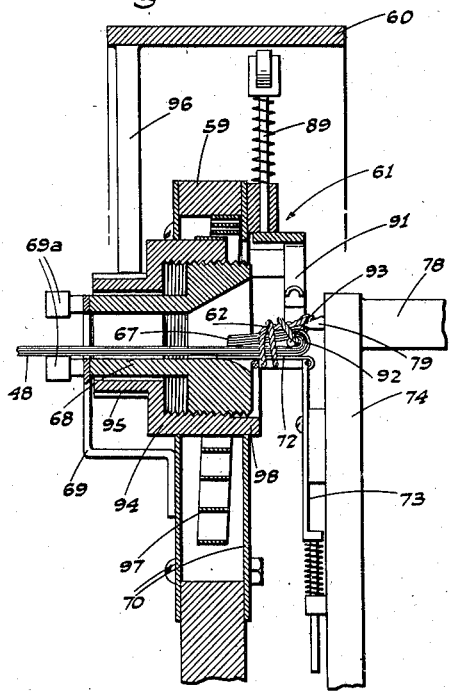
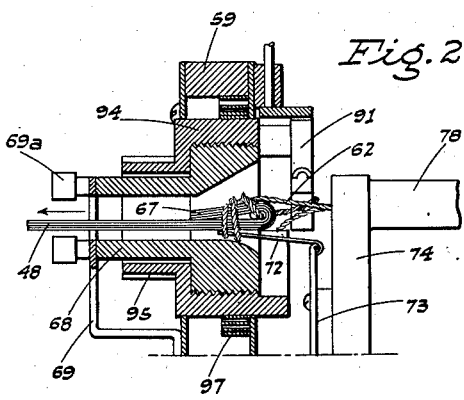
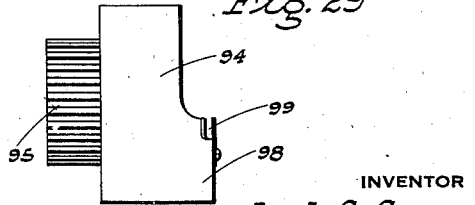
INVENTOR
Joel C. Gunn
BY
ATTORNEYS March 1, 1949.  J. C. GUNN  2,462,957
SAUSAGE CASING TYING MACHINE
Filed Nov. 22, 1947  13 Sheets-Sheet 12

INVENTOR
Joel C. Gunn
BY
ATTORNEYS

March 1, 1949.  J. C. GUNN  2,462,957
SAUSAGE CASING TYING MACHINE
Filed Nov. 22, 1947  13 Sheets-Sheet 13
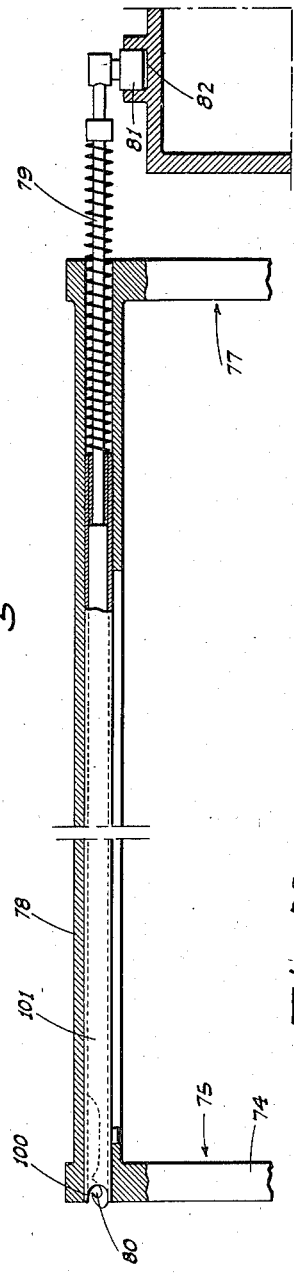
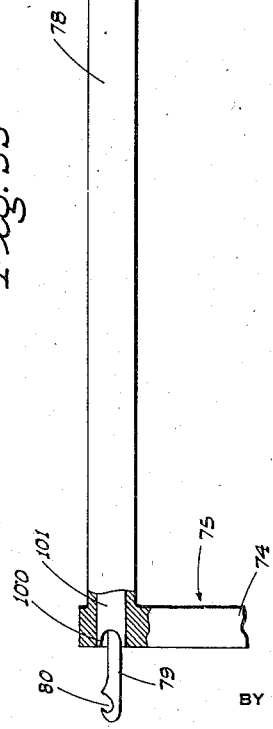
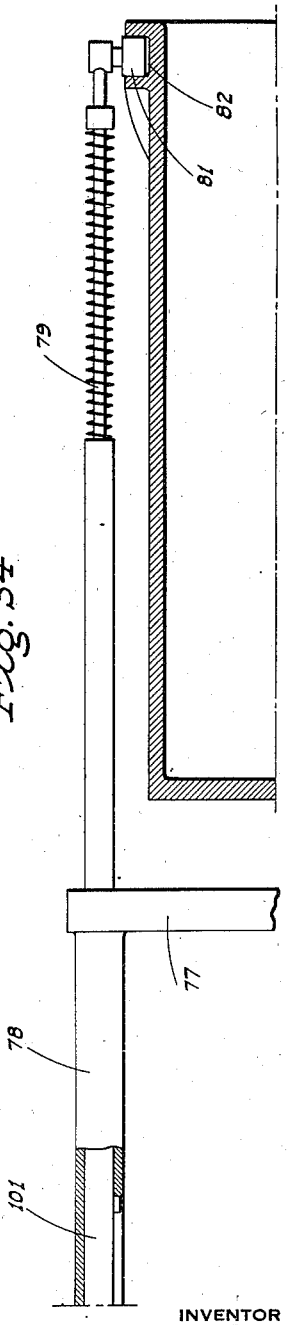
INVENTOR
Joel C. Gunn
BY
ATTORNEYS Patented Mar. 1, 1949

2,462,957

UNITED STATES PATENT OFFICE 2,462,957

SAUSAGE CASING TYING MACHINE

Joel C. Gunn, Sacramento, Calif.

Application November 22, 1947, Serial No. 787,507

20 Claims. (Cl. 17—34)

1

The present invention relates to, and it is an object to provide, a novel, automatic machine for handling artificial sausage casings before filling thereof; the purpose of the machine being to affix, to one end of each casing, a tie and suspension string.

In the sausage manufacturing industry it is the custom to tie one end of each casing with a string, and to then fill the casing from the opposite end. The present invention deals solely with the application or tying of such string.

Heretofore it has been the practice to knot such strings on the casings by hand, which was a slow, tedious, and expensive operation.

The artificial sausage casings are manufactured in tubular but flattened form, and are pre-cut to proper length; such casings then being arranged in stacks.

It is another object of this invention to provide an automatic machine which is operative to feed such tubular but flattened sausage casings, one at a time, from a stack, and thence in timed relation in a predetermined path; the machine, at certain points on said path, acting on each casing successively to fold or pleat the same into a compact longitudinal bundle; to then tie a length of string, tightly knotted, about one end portion of each bundle; and to finally discharge the tied-end casing from the machine.

Another object of this invention is to provide a sausage casing tying machine, as above, including mechanism operative to first double back an end portion of the bundled casing onto an adjacent part thereof and about a pre-fed transverse length of wire; the string then being tied about said doubled-back end portion and adjacent part of the casing inwardly of said length of wire; the latter preventing slippage of the knotted string from the adjacent end of said casing.

An additional object of this invention is to provide an automatic sausage casing tying machine, which comprises, in novel combination, a casing folding unit; a casing supporting and actuating unit to which the folding unit delivers; and a casing tying unit cooperative with the supporting and actuating unit to tie one end of each casing with a string in the manner described.

It is also an object to provide a sausage casing tying machine, as in the preceding paragraph, in

2 which both the casing supporting and actuating unit, and the string tying unit, are rotary and travel in fixed relation; the rotary motion of this assembly being employed effectively, and in novel manner, to operate the several working mechanisms carried by said assembly.

A further object is to provide a reliable machine, and one which will be exceedingly effective for the purpose for which it is designed.

These objects are accomplished by means of such structure and relative arrangement of parts as will fully appear by a perusal of the following specification and claims.

In the drawings:

Fig. 3 is a longitudinal sectional elevation on line 3—3 of Fig. 2.

Fig. 4 is a fragmentary cross section on line 4—4 of Fig. 3.

Fig. 5 is a fragmentary cross section on line 5—5 of Fig. 3.

Fig. 6 is a plan view showing a safety switch which may be employed.

Fig. 7 is a fragmentary plan view of the rotary carrier showing one of the casing gripping mechanisms as just engaged in gripping relation with a casing.

Fig. 8 is a similar view, but shows such casing gripping mechanism as shifted to move the engaged casing into cooperation with the tying unit.

Fig. 11 is an enlarged fragmentary section of the rotary carrier showing a clamp of one of the casing gripping mechanisms approaching a casing in the supporting trough or channel.

Fig. 12 is a similar view, but shows such clamp as spread or opened to engage said casing.

Fig. 13 is also a similar view, but shows the casing as gripped by the clamp.

Fig. 14 is also an enlarged, fragmentary section and illustrates such casing just prior to its release into the carry-off conveyor.

Fig. 15 is a similar view showing the casing as released by opening of the clamp.

Fig. 16 is a fragmentary section of said one clamp and a casing kick-out arm associated therewith and actuated by a downward sweep of the rotary carrier.

Fig. 20 is an enlarged fragmentary end elevation of the rotary disc of the tying unit showing one tying device, including the associated wire feed, cutter, and guide.

Fig. 25 is a fragmentary radial section of said one tying device; the wire guide and cutter being raised and the first turn of string having been made about the doubled-back casing.

Fig. 26 is a similar view but shows two and one-half string wraps about the double back casing; the last wrap being engaged in the needle hook.

Fig. 27 is a view similar to Fig. 26, but illustrates the full number of wraps of the string about the doubled-back casing and the needle being retracted to make the knot.

Fig. 28 is a similar view, but shows the casing as being retracted from said one tying device.

Fig. 29 is an illustration of one of the rotating string wrapping elements or spinners, detached, as used in each of the tying devices.

Fig. 32 is an enlarged fragmentary sectional elevation of the needle mechanism showing one needle as retracted in the corresponding sleeve.

Fig. 33 is a similar view but shows the needle advanced.

Fig. 34 is likewise a similar view but shows the needle and sleeve fully retracted.

Figure 1:
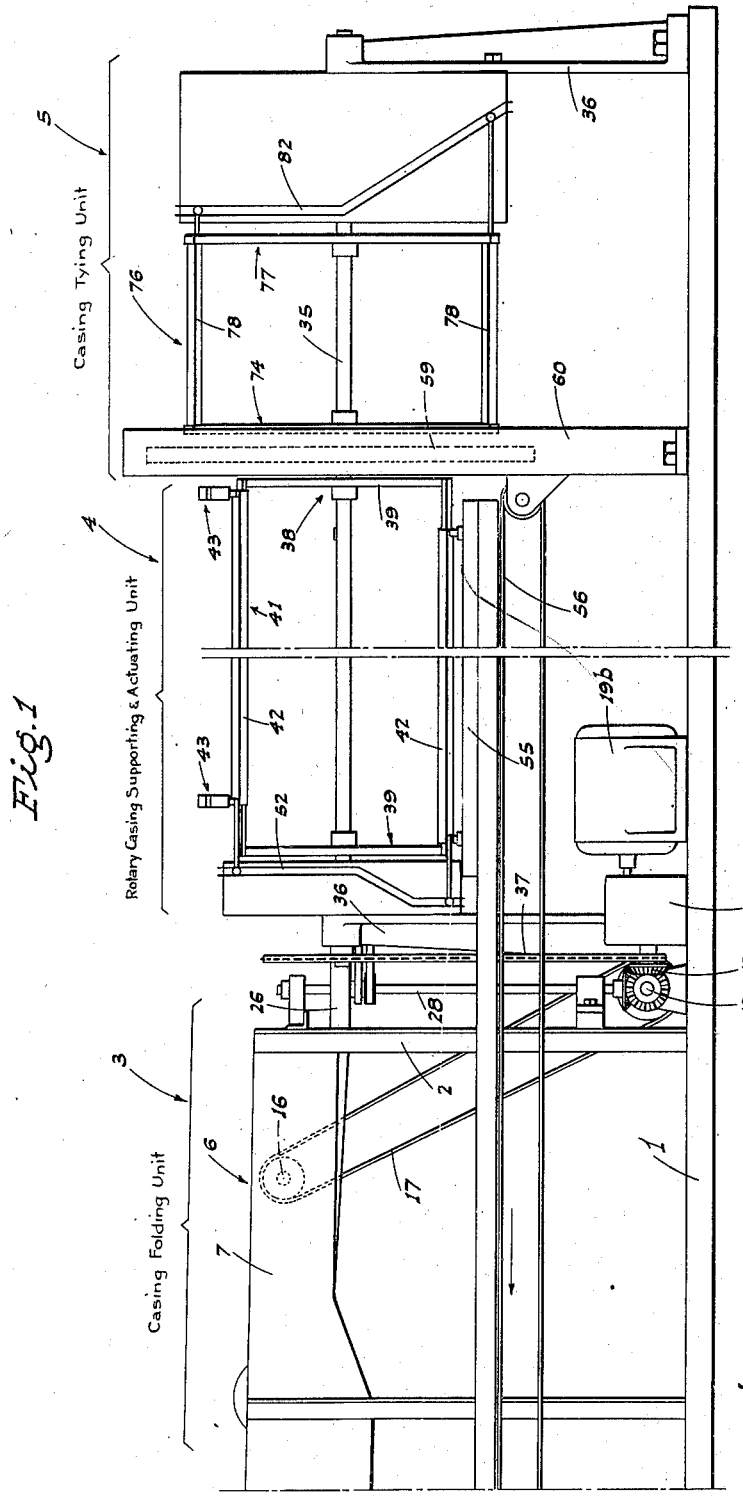
Fig. 1 is a semi-diagrammatic side elevation of the machine.
Figure 2:
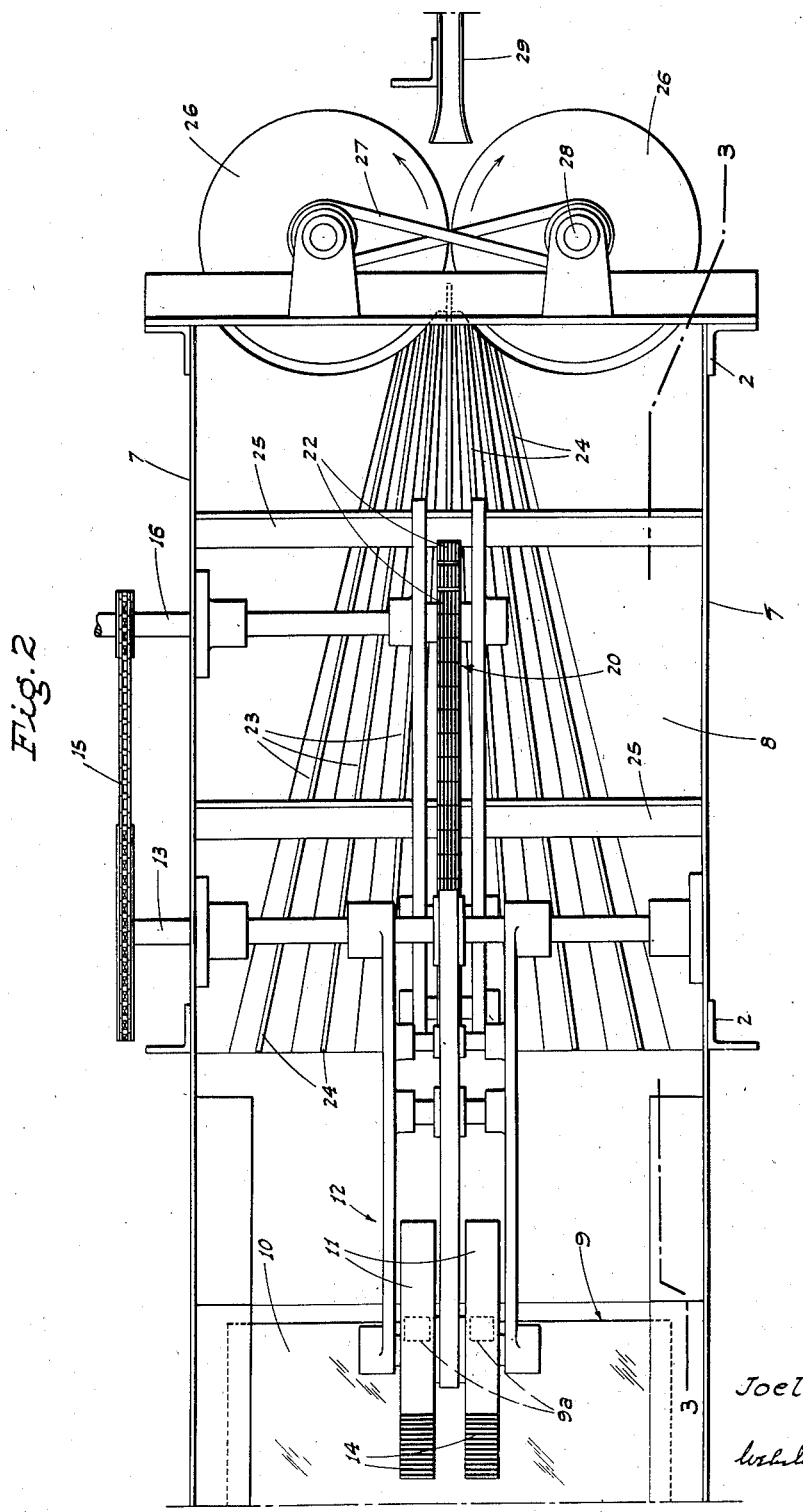
Fig. 2 is a plan view of the casing folding unit.
Figure 9:
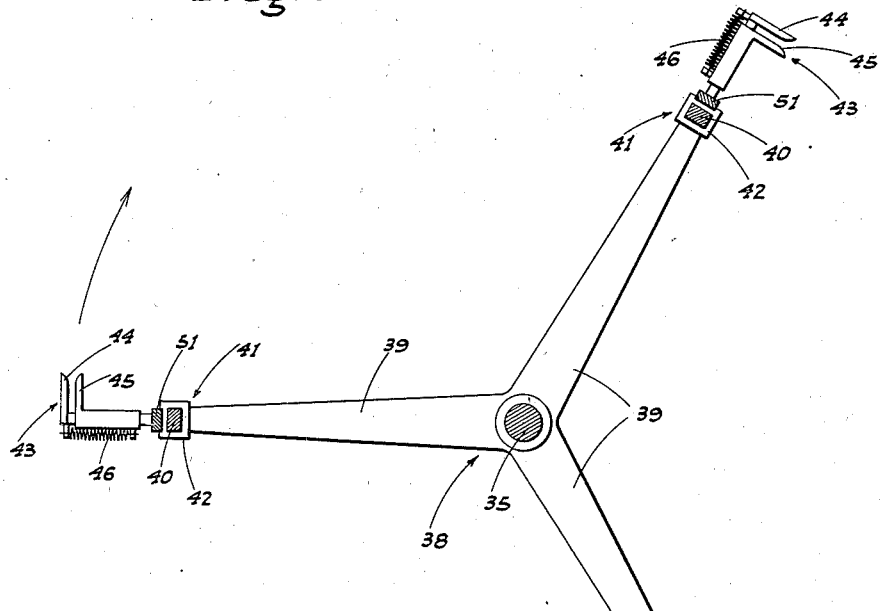
Fig. 9 is a cross section of the rotary carrier.

Referring now more particularly to the characters of reference on the drawings, and at present to Fig. 1, the machine comprises a longitudinal, horizontal base 1 having an upstanding skeleton frame 2 fixed thereon for the mounting of certain of the working parts.

The machine includes, generally, and in longitudinally horizontal alinement above the base 1, a casing folding unit 3; a rotary, casing supporting and actuating unit 4; and a tying unit 5. The arrangement is such that the casing folding unit 3 delivers to the rotary, casing supporting and actuating unit 4, while the latter properly positions each supported casing for end tying thereof with a string, in the manner described, by the tying unit 5.

The casing folding unit 3, which is shown in detail in Figs. 2–5, inclusive, comprises, within a housing 6, the following structural arrangement.

The housing includes sidewalls 7 and a bottom plate 8. Adjacent its outer end, the bottom plate 8 is adapted to support a stack 9 of tubular but flat sausage casings 10 disposed lengthwise of the machine.

These sausage casings 10 are fed, one at a time, and in predetermined timed relation, from the top of the stack 9 along the bottom plate 8 by a pair of feed wheels 11 of a floating feeding device, indicated generally at 12, which is pivotally suspended from, and driven by, a cross shaft 13. Each such feed wheel 11 includes a circumferential friction face 14 of part-circle extent, which serves to recurringly feed the top casing 10 from the stack 9, as described. The cross shaft 13 is driven by an endless chain and sprocket unit 15 from another cross shaft 16 actuated by an endless belt and pulley unit 17 from a shaft 18 journaled in connection with the base 1. The shaft 18 is driven from a suitable gearing mechanism 19 from a reduction gear box 19a powered by an electric motor 19b.

To assure that the casings 10 feed only one at a time from the top of the stack 9, upwardly spring-pressed but downwardly yieldable holding fingers 9a upstand in front of said stack, being rounded at the upper end, as shown, to permit the uppermost casing 10 to be recurringly fed from said stack by the feeding device 12.

Ahead of the floating feeding device 14, the housing 6 encloses a bottom feed, friction conveyor 20 which works in cooperation with the bottom plate 8 to deliver the fed casings 10 in a forward direction; said friction conveyor 20 being mounted on, and driven by, the cross shaft 16. The conveyor 20 preferably includes an endless chain 21 whose links are faced with rubber pads 22.

The tubular but flat casings 10, as each feeds along the bottom plate 8, beneath and by means of the friction conveyor 20, are longitudinally folded or pleated into a bundle which is compact in cross section, by means of the following arrangement:

Beneath said friction conveyor 20 the bottom plate 8 is formed with a plurality of converging channels 23, which channels become progressively narrower and deeper in the direction of travel of the bottom run of the friction conveyor 20. This is clear from Figs. 4 and 5.

Longitudinal creasing ribs 24 are mounted on, and depend from, cross bars 25 into corresponding ones of the channels 23. Thus, with advance by the friction conveyor 20, each of the initially tubular but flattened casings 10 is pleated longitudinally and folded into a lengthwise bundle which is quite compact in transverse section.

At the forward end of the above described pleating mechanism, the folded casings 10 are successively engaged between, and power-advanced forwardly by, a cooperating pair of feed wheels 26, coupled together by a crossing endless belt and pulley unit 27, and one of which wheels is driven by a vertical shaft 28 actuated from the assembly of gearing 19. These feed wheels also positively crease the casings.

Beyond the cooperating feed wheels 26, which are a part of the casing folding unit 3, the machine includes an upwardly opening trough or channel 29 fixed in the main frame of the machine horizontally and lengthwise thereof in position to receive each folded casing as fed by the wheels 26 from the pleating mechanism.

In order to assure against mis-operation of the machine, which would result from more than one casing being fed into the channel, there is provided the safety device shown in Fig. 6.

This safety device comprises a swing arm 30 pivoted, for horizontal motion, about the axis of one of the feed wheels 26; there being a driven roller 31 on the outer end of said swing arm running in the channel 29 from one side thereof. The roller 31 is spaced from the other side of the channel a distance to permit of the passage of a folded one of the casings. However, should two of such casings jam into the channel 29, the roller 31 is urged outwardly; the arm 30 carrying a switch finger 32 which then breaks a contact 33, opening a circuit 34, which stops the motor. This driven roller serves the additional purpose of advancing each casing lengthwise to the correct position in the channel.

Beyond the casing folding unit 3, and in cooperative relation to the channel 29, the machine includes the rotary, casing supporting and actuating unit 4 comprised of the following, and as shown in some detail in Figs. 7 to 16, inclusive:

A central shaft 35 extends horizontally and lengthwise of the machine beyond the casing folding unit 3, and said central shaft is journaled in connection with, and supported by, posts 36; such central shaft 35 being driven from the reduction gear box 19a by an endless chain and sprocket unit 37. It is thus possible to time the central shaft 35, and the working parts carried thereby, in exact predetermined relationship to operation of the feeding device 12 and the pleating mechanism, including the friction conveyor 20 and feed rollers 26, so that folded casings travel through the machine, one at a time, in controlled and timed relation.

A rotary carrier, indicated generally at 38, is fixed on the central shaft 35 and includes end spiders 39 carrying guide bars 40 between corresponding outer ends thereof, and each of these guide bars is mounted with a casing gripping mechanism, as indicated generally at 41.

As such casing gripping mechanisms are all alike, a description of one will suffice. Each such casing gripping mechanism comprises a sleeve 42 slidable along the corresponding guide bar 40, and such sleeve is fitted, at the ends, with casing clamps 43 which project outwardly.

Thus, each casing gripping mechanism 41 includes a longitudinally spaced pair of the clamps 43 on the corresponding sleeve 42, and each such clamp includes a fixed outer jaw 44 and a movable inner jaw 45 normally urged toward the outer jaw by a spring 46. Thus, the clamps 43, which face in the direction of rotation, are normally closed.

The channel 29 intersects the paths of rotation of the clamps 43 of each pair, and said channel is cut away at the points of intersection, as at 47, to permit the clamps to work upwardly through the channel from below whereby to engage, grip, and pick up from said channel the folded casing, here indicated at 48, previously deposited in said channel from the feed rolls 26.

When each pair of clamps 43 approaches the channel 29 from below, the corresponding sleeve 42 is in a position to the left, i. e. remote from the tying unit 5, as in Fig. 7, and said jaws are closed, as in Fig. 11. Before said pair of clamps reaches the channel 29, lateral pins 49 on the movable jaws 45 engage and ride along clamp opening cams 50, opening said clamps, as in Fig. 12, and maintaining them open until such clamps engage the casing 48 in the channel 29, whereupon the pins 49 escape the cams 50, and the clamps 43 positively grip the casing 48, as in Fig. 13.

With continued rotation of the rotary carrier 38, the casing 48 in the clamps 43 is raised a certain distance from the channel 29, and thence the sleeve 42 is automatically shifted in the manner hereinafter described, full to the left, in order to project the forward end of the casing 48 into the tying unit 5.

Advancing and retracting of each sleeve 42 on the corresponding guide bar 40 is accomplished by a control arm 51 affixed to each sleeve 42 and overhanging a circuitous cam track 52 fixed in the frame, which cam track is of channel type. The control arm 51 includes a roller 53 traveling in the cam track 52.

Figure 10:
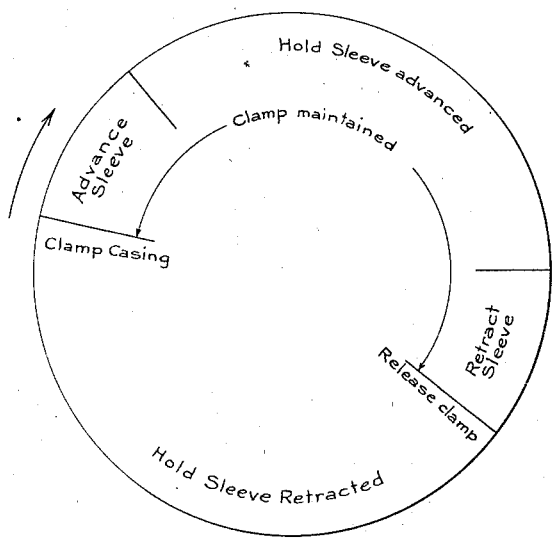
Fig. 10 is a diagram of the operating cycle of the actuating cam for the casing gripping mechanisms of the rotary carrier.

A diagrammatic illustration of the cycle of motion of the sleeve 42, under influence of the cam track 52, is set forth in Fig. 10. In this diagrammatic figure the words "Advance" and "Retract" mean motion of each sleeve 42 and supported casing 48 toward, and away from, the tying unit, respectively.

The gripping and release points of the pairs of clamps 43 are also illustrated in this diagrammatic view.

As each longitudinally extending, folded casing 48 is lifted out of the channel 29 to a predetermined point thereabove, the cam track 52 then acts to advance the sleeve 42 and said casing 48 toward the carrying unit 5, as explained above.

The casing 48 remains advanced and in cooperative relation to the carrying unit 5 through that part-circle extent of turning of the rotary carrier 38, indicated by the notation "Hold sleeve advanced," in Fig. 10. It is during this part-circle extent of turning of the rotary carrier 38 that the adjacent end of the casing 48 is tied with a string by the mechanism, and in the manner, hereinafter described.

After this string tying operation, and as the rotary carrier 38 reaches the end of the "Hold sleeve advanced" part of each revolution, the cam track 52 acts to retract the sleeve 42, together with the corresponding clamps 43, and the then end tied casing 48 gripped therein. Upon the sleeve 42 being so retracted the lateral pins 49 of the clamps 43 engage and ride upon clamp-opening cams 54, as shown in Figs. 14 and 15; this occurring directly above a casing receiving hopper 55 extending along a carry-off conveyor 56 disposed adjacent the bottom of the rotary carrier 38, and which conveyor delivers the end tied casings from the machine. As the pins 49 ride onto corresponding cams 54, the clamps 43 open, as illustrated in Fig. 15, and the engaged casing 48 then drops into the hopper 55 onto the conveyor 56 for delivery from the machine.

To assure that the casings 48 not stick in the clamps 43 when the latter are opened above the hopper 55, the kick-out mechanism shown in Fig. 16 is employed, which mechanism comprises, adjacent each clamp 43, a pivotally mounted, kick-out arm 57 formed with a half loop 58 at one end adapted to strike the casing 48 in a direction to discharge it from the clamps, upon the other end of said arm being engaged by the corresponding sleeve 42.

After discharge of each casing 48 from the corresponding pair of clamps 43, the sleeve is held retracted until said clamps again pick another casing from the channel 29. The tying unit 5, which will now be described in detail, comprises a rotary disc 59 fixed on the central shaft 35 adjacent, and for unitary turning motion with, the rotary carrier 38; said disc being enclosed, about its periphery, with a protective housing 60. At circumferentially spaced points thereon, corresponding to, and in alinement with the longitudinal position of casings 48 carried by pairs of clamps 43, the rotary disc 59 is fitted with tying devices, each indicated at 61. As the corresponding casing 48 is lifted from the channel 29 and advanced with the sleeve 42, the forward end of said casing projects into the alined tying device 61 and remains therein for the part of the revolution of the mechanism identified in Fig. 10 as "Hold sleeve advanced."

Figure 17:
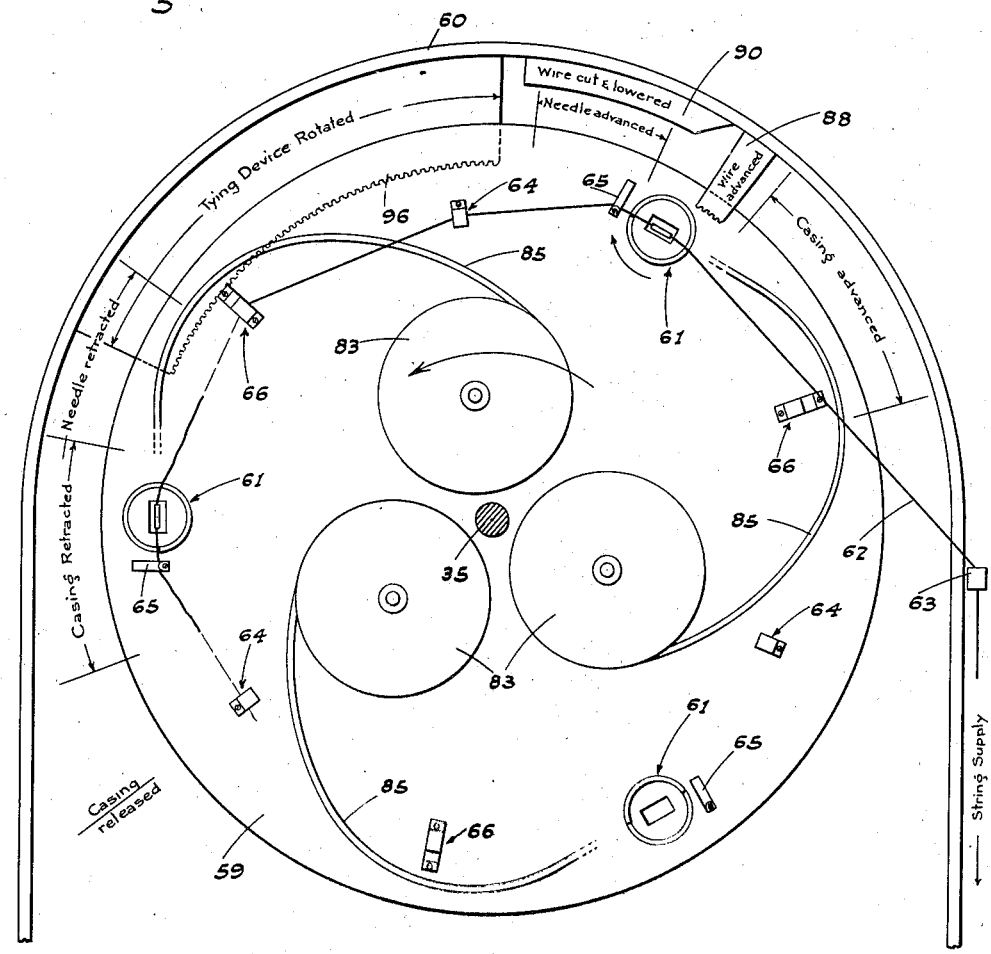
Fig. 17 is a somewhat diagrammatic end elevation of the rotary disc of the tying unit and cooperating gear and cam members; this view showing the path of the string as threaded in the machine.

The relative positions of the tying devices 61 on the rotary disc 59 are illustrated diagrammatically in Fig. 17, while a detailed showing of one of the devices may be found, in its various working positions, in Figs. 20-29, inclusive.

As each tying device 61 is a duplicate of the others, a detailed description of one is sufficient for this specification, except in connection with the threading of the string, which is as follows:

The casing tying string, indicated at 62, leads across the face of the rotary disc 59 from a source of supply (not shown), but traversing a guide 63. From the guide 63 the string, upon rotation of the disc 59, is successively picked up—in relation to each tying device 61—by a string guide and tensioning device 64 and another guide 65, both leading the tying device 61, and a string tensioning and cutting device 66 trailing said tying device 61.

Each tying device 61 also picks up the string 62; the string being threaded, as described, on the upturning side of the rotary disc 59. An end portion 67 of the casing 48 has been projected through each tying device 61 before the string 62 is reached, and facilitates threading or engagement of the string with each tying device.

Each tying device comprises a tubular body 68 supported, in non-rotatable relation, by a bracket 69 from one of a pair of mounting plates 70 which overlies opposite sides of an opening 71 in the rotary disc 59. The tubular body 68 extends through the mounting plates 70 in alinement with the path of advancing motion of the corresponding casing 48; the end portion 67 of said casing traveling through the tubular body 68 during advance of said casing.

Guides 69a projecting from brackets 69 assure proper entry of the adjacent end of each casing into the corresponding device 61 when said casing is clear of the channel and is being advanced.

Figure 22:
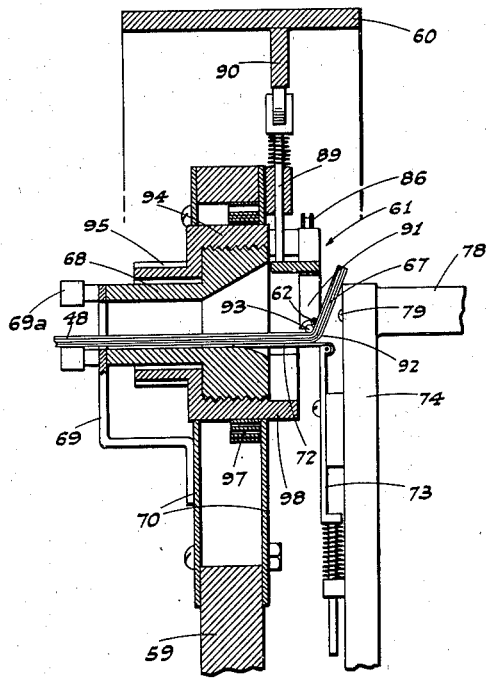
Fig. 22 is a similar view showing the wire as lowered into casing engagement by the wire guide and cutter.

As the end portion 67 of a casing advances through the tubular body 68 it strikes, and is deflected at a radially outward incline by, a similarly inclined, deflector plate 72 mounted, at its outer end, on a spring-pressed slide 73 which yieldably maintains the inclination of the deflector plate 72 but permits it to depress, as in Fig. 22, to a position parallel to the axis of rotation of the disc 59. The slide 73 is carried on an adjacent leg 74 of a spider, indicated generally at 75, mounted on the central shaft 35 adjacent but spaced from the rotary disc 59 and turning therewith in fixed relation.

Figure 31:
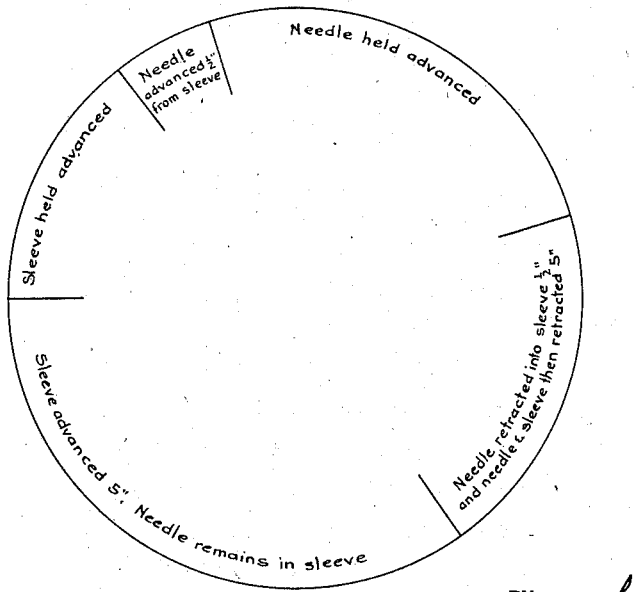
Fig. 31 is a diagram of the operating cycle of the needle actuating cam.

The free or inner end of the deflector plate 72 rests against the tubular body 68 within the body thereof, as shown. The spider 75 is included in the knotting needle mechanism of the machine, which mechanism is indicated generally at 76, and includes, with said spider 75, another matching spider 77 in axially spaced relation; the legs of said spider being connected, at the outer end, by tubular bars 78, in each of which an elongated needle 79 is slidably mounted. Each such needle 79 includes a hook 80 at its working end; i. e. the end adjacent the rotary disc 59, and at the opposite end the needles 79 project beyond the spider 77 and are there each fitted with a roller 81 which runs in a channel-like cam track 82 fixed in the main frame. The cam track 82 is of a configuration to operate the needles 79 each through a cycle as represented diagrammatically in Fig. 31. The action of each needle 79, in relation to the other working parts of the corresponding tying device 61, is hereinafter described and is illustrated in Figs. 23-27, inclusive.

Figure 21:
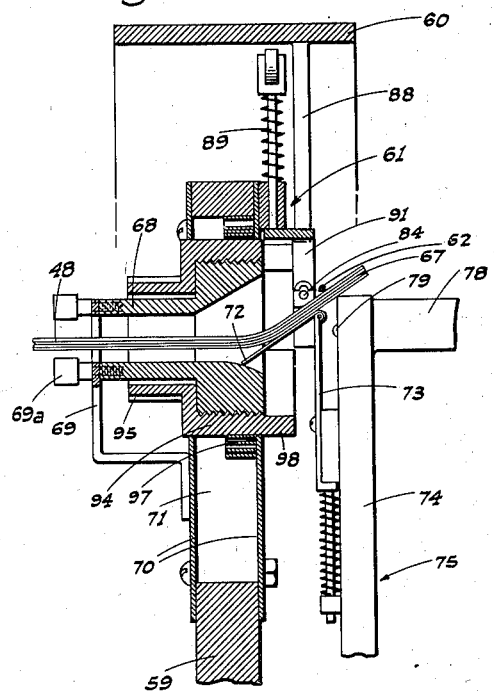
Fig. 21 is a fragmentary radial section of said one tying device taken on line 21—21 of Fig. 20, and shows a casing advanced into tying position (as in Fig. 8).

After each casing 48 projects through the corresponding tying device 61, and the end portion 67 of such casing engages the adjacent deflector plate 72 and is inclined outwardly, as in Fig. 21, the following described wire feed, cutter, and guide mechanism comes into play:

A spool 83 carrying non-metallic wire 84 is rotatably mounted on the disc 59 in corresponding relationship to each tying device 61, and includes a guide duct 85 leading from such spool to the tying device 61. At such tying device the wire delivers from the duct 85 between a pair of feed gears 86, and thence passes through a guide block 87 which delivers the wire in intersecting relation to the projecting and inclined end portion 67 of the casing, as in Fig. 21. With rotation of the disc 59, the feed gears 86 are operated at a predetermined time, as illustrated by the cycling diagram of Fig. 17, by a fixed gear segment 88 projecting inwardly from the housing 60 for actuating engagement with one of the feed gears 86. When this occurs the wire 84 is fed out from the block 87 a predetermined distance to cross or intersect the inclined end portion 67 of the casing; said one feed gear 86 then escaping the fixed gear segment 88.

The next operational step for each tying device 61 is engagement of a radial plunger 89 with a cam 90 mounted internally on the housing 60; such cam being of limited arcuate extent. The plunger 89 is fixed, on its inner end, with a U-shaped wire guide and cutter 91, which—when urged radially inward by the cam actuated plunger 89—cuts the wire 84 at the end of the block 87 and projects such cut length of wire inwardly against the adjacent portion 67 of the casing 48; imparting a relatively sharp bend 92 to said casing, as illustrated in Fig. 22. This bend occurs by reason of the fact that the outer end of the portion 67 of the casing rests against the end of the adjacent spider leg 74, and when the bend 92 is made, the deflector plate 72 is pressed downward to its position parallel to the axis of the body 68.

Figure 23:
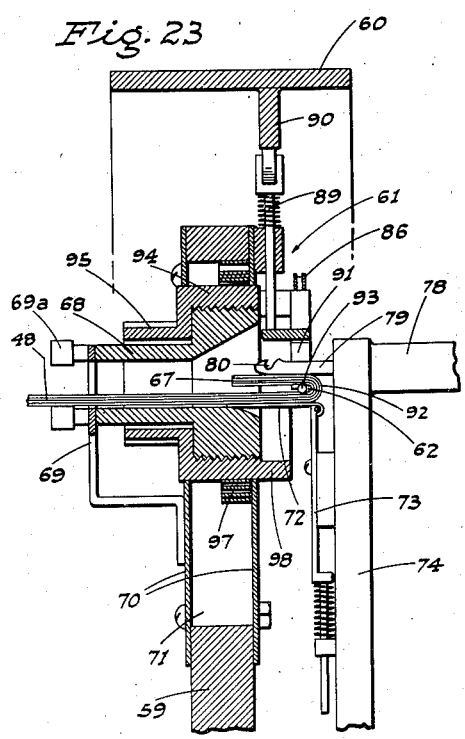
Fig. 23 is also a similar view, but shows the corresponding needle as advanced to double back the outer end portion of the casing over the wire and into engagement with the adjacent part of said casing.
Figure 24:
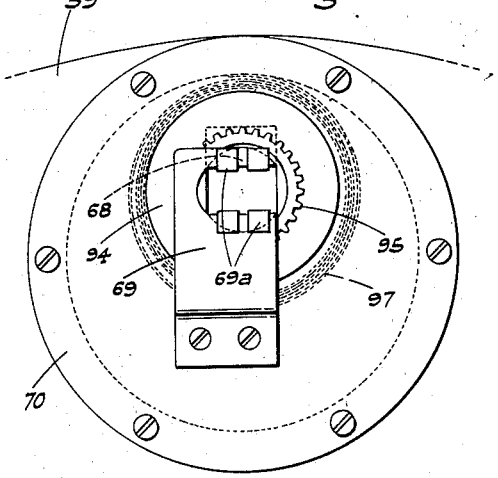
Fig. 24 is a front elevation of one of the string tying devices as mounted on the rotary disc of the tying unit.
Figure 30:
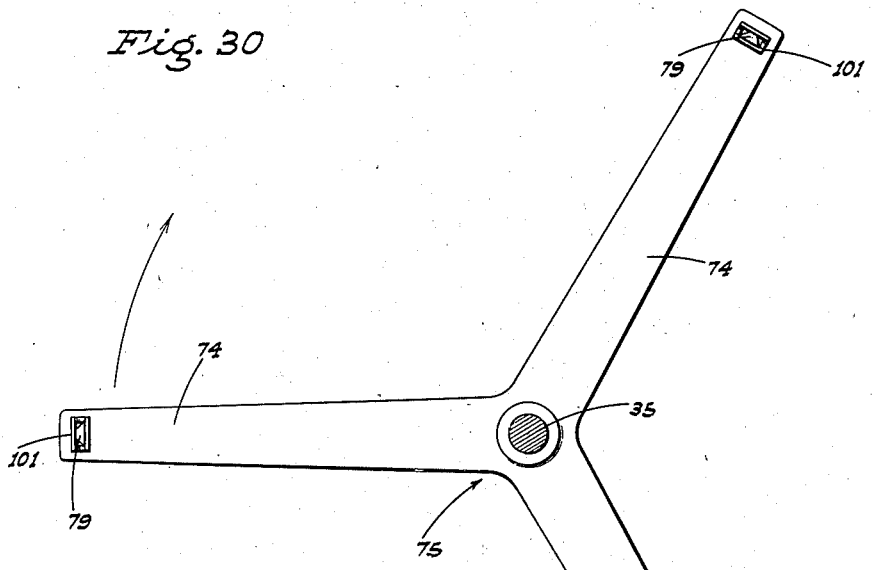
Fig. 30 is an end elevation of the rotary, needle mechanism.

Immediately upon this occurring, the cam track 82 acts to advance the corresponding needle 79, which then projects out of its tubular bar 78 into engagement with the end portion 67 of the casing 48, folding such end portion back upon itself, as shown in Fig. 23; the cut length of wire, as now illustrated at 93, together with the string 62 as threaded on the rotary disc 59, being caught in the fold, as shown in said figure. The advanced needle 79 remains in the above position for the string winding operation which occurs at the next sequence of the machine, as follows:

Each tying device 61 includes, about the tubular body 68, a rotary spinner 94 threaded on the outside of said body 68, with threads of a size to shift said spinner 94 a distance equal to one diameter of the string 62 with each revolution of such spinner. The threading is such that the spinner 94 moves axially away from the spider 75 upon rotation of said spinner; such rotation being accomplished by a toothed neck 95 which projects from the spinner 94 for engagement with a cooperating gear segment 96 mounted in the housing 60 for engagement by said toothed neck 95. A clock-type coil spring 97 surrounds the spinner 94 and is connected between the same and the disc 59 whereby to normally maintain said spinner in its advanced position toward the spider 75. When said spinner 94 is rotated in a direction to retract it relative to said spider, the spring 97 is loaded so that it is ready to accomplish return rotation of the spinner to its starting position. The spinner 94 of each tying device 61 includes a half moon or half circular string wrapping projection 98, which includes a string receiving notch 99, both as clearly shown in Fig. 29.

When the rotary disc 59 progresses through the part of each revolution identified as "Tying device rotated," in the diagram of Fig. 17, the gear segment 96 cooperatively engages with the toothed neck 95 of the spinner 94, whereupon the string wrapping projection or halfmoon 98 picks up the string 62 in the notch 99 and spins it about the folded-back end portion 67 and the adjacent part of the casing 48, as shown in Figs. 25 and 26. Three turns or wraps of the string 62 are made, as above described, which wraps also extend about the projecting needle 79 and the deflector plate 72; the last turn or wrap falling into the hook 80, as illustrated in Fig. 26.

The turns or wraps of the string are made side by side by reason of the retraction of the rotary spinner 94 as it rotates.

After such three turns or wraps of the string 62 have been made, the toothed neck 95 of the spinner 94 escapes the gear segment 96, whereupon the then loaded spring 97 rotates the spinner 94 back to its starting position, and for its next cycle of operations, upon the following revolution of the disc 59.

When the string wrapping operation is complete, the cam track 82 acts on the corresponding needle 79 to retract it into the tubular bar 78, at which time the turn of the string 62, which is engaged by the hook 80, is pulled under and through the remaining turns or wraps, as illustrated in Fig. 27, making the desired knot; the pulled under loop being drawn by the hook 80 into the tubular bar 78, as shown in Fig. 28.

As the needle 79 continues to retract into the tubular bar 78, the hook-engaged turn of the string is pulled further through the other turns and into engagement with the notched end 100 of a spring-pressed sleeve 101 in the corresponding bar 78 about the needle. This imposes a friction grip against the needle engaged loop of the string and prevents its easy sliding lengthwise through the hook 80. The cam continues then to retract the needle 79 and the sleeve 101 farther into the bar 78, all the time tightening the knot about the folded-back end portion of the casing. The respective positions of the needle 79 and spring-pressed sleeve 101 are illustrated in Figs. 32–34, inclusive, while a diagram of the needle cycle will be found in Fig. 31.

Figure 18:
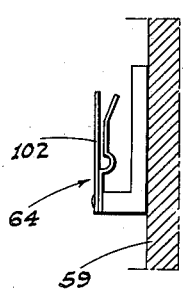
Fig. 18 is an enlarged sectional elevation of one of the string guide and tensioning devices.
Figure 19:
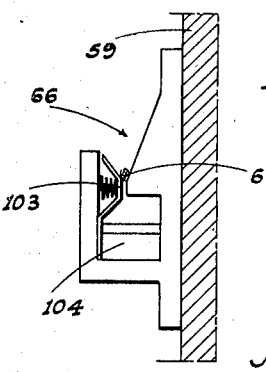
Fig. 19 is an enlarged sectional elevation of one of the string tensioning and cutting devices.

When the needle 79 reaches its position of full retraction into the tubular bar 78, the following operation takes place to cut the string so that the wrapped around and knotted portion thereof may remain with the casing 48:

The string guide and tensioning device 64 which leads each carrying device 61 includes a spring clip 102, as illustrated in Fig. 18, while the string tensioning and cutting device 66 includes a normally operative spring actuated string clamp 103 in which the string normally engages. Inwardly of the clamp 103, which opens under predetermined tension on the string 62, is a cutter 104.

After the above described knotting operation of each tying device 61, and after full retraction of the corresponding needle 79, the tension as imposed on the string at the clamp 103 by operation of the next following unit 61 becomes such that the string snaps through such clamp, engages, and is severed by, the cutter 104.

With one end of the tie string thus severed, the machine, by reason of the operation of cam track 52, then operates to retract the corresponding sleeve 42 to withdraw the knotted end casing 48 out of the corresponding tying device 61 on the rotary disc 59. When this occurs, the remaining end of the previously severed string pulls through and escapes the guides 64 and 65 as well as the hook 80 of the then retracted needle 79; both ends of the string then following the knotted end casing out of the tying device 61. Also, at this time the knotted end portion of the casing slips off the deflector plate 72, and said plate, under the action of its spring-pressed slide 73, returns to its normal starting position.

When clear of such tying device, and at the point marked "Casing release" in the cycling diagram of Fig. 17, such casing is automatically discharged in the manner, and by the mechanism, heretofore described, into the hopper 55 and onto the carry-off conveyor 56.

As will be evident, the operation of each tying device 61, with each revolution of the rotary disc 59, follows exactly the same cycling or steps relative to a corresponding casing 48 projected automatically through said tying device.

With the above described machine, sausage casings of artificial type are knotted at one end with a string in a practical and effective manner, eliminating the necessity of hand tying as heretofore practiced. The machine not only accomplishes the ready application and knotting of the string, but also inserts, at the bend, the short length of wire, which prevents the knot from slipping off the adjacent end of the casing. As indicated, this wire is non-metallic, and preferably of a semi-solid rubber or a synthetic composition.

From the foregoing description it will be readily seen that there has been produced such a device as substantially fulfills the objects of the invention as set forth herein.

While this specification sets forth the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A sausage casing tying machine comprising a main frame, a power driven casing folding and feeding unit mounted on the frame operative to pleat and fold initially flat sausage casings each into a transversely compact longitudinal bundle and to then advance the same one at a time along a predetermined path, a support on the frame to which the folded casings are thus fed, a power driven string tying unit mounted on the frame adjacent the support, a power driven casing actuating unit mounted on the frame adjacent said support arranged to receive each folded casing from the same and to advance said casing to, and thereafter retract it from the tying unit, the latter being operative upon advance of each casing to knot a length of string about one end portion of the casing, and power driving means connected to the casing folding and feeding unit, the string tying unit, and the casing actuating unit to cause operation thereof in predetermined timed relation.

2. A sausage casing tying machine comprising a main frame, a power driven casing folding and feeding unit mounted on the frame operative to pleat and fold initially flat sausage casings each into a transversely compact longitudinal bundle and to then advance the same one at a time along a predetermined path, a support on the frame to which the folded casings are thus fed, a power driven string tying unit mounted on the frame adjacent the support, a power driven casing actuating unit mounted on the frame adjacent said support arranged to receive each folded casing from the same and to advance said casing to, and thereafter retract it from the tying unit, the latter being operative upon advance of each casing to knot a length of string about one end portion of the casing, and power driving means connected to the casing folding and feeding unit, the string tying unit, and the casing actuating unit to cause operation thereof in predetermined timed relation; the casing folding and feeding means including a longitudinal platform corrugated lengthwise thereof, the corrugations converging forwardly and in such direction decreasing in width and increasing in depth, casing folding ribs mounted lengthwise in the corrugations, and a feeder operative to advance initially flat sausage casings one at a time between said platform and ribs.

3. A sausage casing tying machine comprising a main frame, a power driven casing folding and feeding unit mounted on the frame operative to pleat and fold initially flat sausage casings each into a transversely compact longitudinal bundle and to then advance the same one at a time along a predetermined path, a support on the frame to which the folded casings are thus fed, a power driven string tying unit mounted on the frame adjacent the support, a power driven casing actuating unit mounted on the frame adjacent said support arranged to receive each folded casing from the same and to advance said casing to, and thereafter retract it from the tying unit, the latter being operative upon advance of each casing to knot a length of string about one end portion of the casing, and power driving means connected to the casing folding and feeding unit, the string tying unit, and the casing actuating unit to cause operation thereof in predetermined timed relation; the support being a fixed channel into which each folded casing is fed, the tying unit and the casing actuating unit being rotary and connected for rotation as a unit, the casing actuating unit including means to pick up each casing from the channel, said means being shiftable parallel to the axis of rotation, and cam means operative, upon rotation of said casing actuating unit, to shift said pick-up means to so advance and retract the picked-up casing to and from the tying unit.

4. A sausage casing tying machine comprising a main frame, a power driven casing folding and feeding unit mounted on the frame operative to pleat and fold initially flat sausage casings each into a transversely compact longitudinal bundle and to then advance the same one at a time along a predetermined path, a support on the frame to which the folded casings are thus fed, a power driven string tying unit mounted on the frame adjacent the support, a power driven casing actuating unit mounted on the frame adjacent said support arranged to receive each folded casing from the same and to advance said casing to, and thereafter retract it from the tying unit, the latter being operative upon advance of each casing to knot a length of string about one end portion of the casing, and power driving means connected to the casing folding and feeding unit, the string tying unit, and the casing actuating unit to cause operation thereof in predetermined timed relation; the support being a fixed channel into which each folded casing is fed, the tying unit and the casing actuating unit being rotary and connected for rotation as a unit, the casing actuating unit including means to pick up each casing from the channel, said means being shiftable parallel to the axis of rotation, and cam means operative, upon rotation of said casing actuating unit, to shift said pick-up means to so advance and retract the picked-up casing to and from the tying unit; the latter including a string tying device embodying a string spinner through which each folded casing projects when advanced.

5. A sausage casing tying machine comprising a main frame, a power driven casing folding and feeding unit mounted on the frame operative to pleat and fold initially flat sausage casings each into a transversely compact longitudinal bundle and to then advance the same one at a time along a predetermined path, a support on the frame to which the folded casings are thus fed, a power driven string tying unit mounted on the frame adjacent the support, a power driven casing actuating unit mounted on the frame adjacent said support arranged to receive each folded casing from the same and to advance said casing to, and thereafter retract it from the tying unit, the latter being operative upon advance of each casing to knot a length of string about one end portion of the casing, and power driving means connected to the casing folding and feeding unit, the string tying unit, and the casing actuating unit to cause operation thereof in predetermined timed relation; the support being a fixed channel into which each folded casing is fed, the tying unit and the casing actuating unit being rotary and connected for rotation as a unit, the casing actuating unit including means to pick up each casing from the channel, said means being shiftable parallel to the axis of rotation, and cam means operative, upon rotation of said casing actuating unit, to shift said pick-up means to so advance and retract the picked-up casing to and from the tying unit; the latter including instrumentalities operative to dispose a length of wire and a length of string across said end portion of each casing as advanced, to then double back said end portion over the wire and string, and thence knot the string about said doubled back portion and the adjacent part of the casing.

6. A sausage casing tying machine comprising a main frame, a power driven string tying unit mounted on the frame, a power driven casing supporting and actuating unit mounted on the frame adapted to advance each supported casing to and thereafter retract the same from the tying unit, the latter being operative upon advance of each casing to knot a length of string about one end portion thereof, and power driving means connected to the tying unit and casing supporting and actuating unit to cause operation thereof in predetermined timed relation.

7. A sausage casing tying machine comprising a main frame, a power driven string tying unit mounted on the frame, a power driven casing supporting and actuating unit mounted on the frame adapted to advance each supported casing to and thereafter retract the same from the tying unit, the latter being operative upon advance of each casing to knot a length of string about one end portion thereof, and power driving means connected to the tying unit and casing supported and actuating unit to cause operation thereof in predetermined timed relation; said units being rotary, and a central, driven shaft upon which the units are fixed for rotation in unitary relation, the casing supporting and actuating unit including a slide member mounted radially out from but shiftable parallel to the shaft, casing supporting means on said slide member adapted to carry a casing likewise parallel to the shaft, cam means operative to reciprocate the slide member upon rotation of the shaft to thus advance a supported casing to and retract it from the tying unit.

8. A sausage casing tying machine comprising a main frame, a power driven string tying unit mounted on the frame, a power driven casing supporting and actuating unit mounted on the frame adapted to advance each supported casing to and thereafter retract the same from the tying unit, the latter being operative upon advance of each casing to knot a length of string about one end portion thereof, and power driving means connected to the tying unit and casing supported and actuating unit, to cause operation thereof in predetermined timed relation; said units being rotary and a central, driven shaft upon which the units are fixed for rotation in unitary relation, the casing supporting and actuating unit including spaced radial legs on the shaft, a bar connecting the ends of the legs, a slide sleeve on the bar, spaced casing engaging clamps on the sleeve adapted to carry a casing parallel to said bar, and cam actuated means associated with said sleeve operative to reciprocate the same upon rotation of the shaft to thus advance and retract a supported casing relative to the tying unit.

9. A sausage casing tying machine comprising a main frame, a power driven string tying unit mounted on the frame, a power driven casing supporting and actuating unit mounted on the frame adapted to advance each supported casing to and thereafter retract the same from the tying unit, the latter being operative upon advance of each casing to knot a length of string about one end portion thereof, and power driving means connected to the tying unit and casing supported and actuating unit to cause operation thereof in predetermined timed relation; said units being rotary, and a central, driven shaft upon which the units are fixed for rotation in unitary relation, the casing supporting and actuating unit including spaced radial legs on the shaft, a bar connecting the ends of the legs, a slide sleeve on the bar, spaced casing engaging clamps on the sleeve adapted to carry a casing parallel to said bar, and cam actuated means associated with said sleeve operative to reciprocate the same upon rotation of the shaft to thus advance and retract a supported casing relative to the tying unit, the tying unit including a string tying device having a string spinner through which the casing projects when advanced, said spinner deriving its rotation in a string spinning direction from rotation of the tying unit relative to a fixed part mounted in connection with the frame.

10. A sausage casing tying machine comprising a main frame, a central, driven shaft, a power driven string tying unit including a rotary member fixed on the shaft and a tying device mounted on said member for travel therewith, said tying device having a passage therethrough parallel to the shaft for reception of one end portion of a casing, and a casing supporting and actuating unit axially alined with the tying unit including a pair of radial arms fixed on the shaft, a bar parallel to the shaft connecting the arms, a slide sleeve on the bar, cam means to reciprocate the slide sleeve upon rotation of the shaft, and spaced casing clamps on the sleeve adapted to support a casing parallel to the shaft and alined with said tying device whereby to advance and retract the casing to project one end portion through and then withdraw the same from said tying device, the latter being operative in timed relation to knot a length of string about said end portion of each casing as projected through said tying device.

11. A sausage casing tying machine, as in claim 10, including a casing supporting channel mounted parallel to the shaft across the path of the casing clamps, the channel opening in the direction of rotation and having cut-away portions to permit passage of the clamps in casing pick-up relation; said clamps being spring closed, and cam means arranged to open the clamps ahead of the channel and to close the clamps upon pick-up of a casing from the channel, and to then reopen the clamps after said reciprocation of the sleeve and supported casing to and from the tying unit.

12. A sausage casing tying machine comprising a frame, a driven shaft on the frame, a tying unit including a rotary disc fixed on the frame, and a plurality of open string tying devices in circumferentially spaced relation on the disc, each operative to knot a length of string about the end portion of a casing projected therethrough; and a casing supporting and actuating unit including a rotary assembly fixed on the shaft adjacent said disc, slide means adapted to clampingly support separate casings in alinement with corresponding tying devices, and cam means operative upon rotation of said assembly to reciprocate the slide means to advance the adjacent end portions of the casings through corresponding tying devices and to then withdraw said end portions.

13. A sausage casing tying machine comprising a main frame, sausage casing supporting means mounted on the frame operative to advance the casing through a predetermined longitudinal path and then retract said casing after a predetermined time lag, and a casing tying device mounted on the frame in the path of advancing motion of and in string tying relation to one end portion of a casing; said casing tying device comprising a body having a bore through which said end portion of the casing projects when advanced, and power actuated mechanism associated with the body operative to then knot a string about said end portion of the advanced casing.

14. A sausage casing tying machine comprising a main frame, sausage casing supporting means mounted on the frame operative to advance the casing through a predetermined longitudinal path and then retract said casing after a predetermined time lag, and a casing tying device mounted on the frame in the path of advancing motion of and in string tying relation to one end portion of a casing; said casing tying device comprising a body having a bore through which said end portion of the casing projects when advanced, and power actuated mechanism associated with the body operative to double back said end portion of the advanced casing and then knot a string about said doubled back end portion and the adjacent part of said casing.

15. A sausage casing tying machine comprising a main frame, sausage casing supporting means mounted on the frame operative to advance the casing through a predetermined longitudinal path and then retract said casing after a predetermined time lag, and a casing tying device mounted on the frame in the path of advancing motion of and in string tying relation to one end portion of a casing; said casing tying device comprising a body having a bore through which said end portion of the casing projects when advanced, a length of string threaded to intersect said end portion of the casing, a power actuated spinner associated with the body operative to wrap the string about said end portion of the casing, and power actuated means to knot said wrapped-around string; all in predetermined timed relation to advancing and retracting of said casing.

16. A sausage casing tying machine comprising a main frame, sausage casing supporting means mounted on the frame operative to advance the casing through a predetermined longitudinal path and then retract said casing after a predetermined time lag, and a casing tying device mounted on the frame in the path of advancing motion of and in string tying relation to one end portion of a casing; said casing tying device comprising a body having a bore through which said end portion of the casing projects when advanced, means arranged to hold a length of string threaded in intersecting relation to said projecting end portion of the casing, a deflector adjacent said bore operative to bend said projecting end portion of the casing at an angle to the path of its advancing motion, a needle mounted to advance from a direction opposite said path of advancing motion to engage and double back the inclined end portion of the casing over the string and onto an adjacent part of said casing, a string spinner mounted for rotation about the body and projecting casing, the spinner including an element adapted to engage the string and wrap the same with a number of turns about the casing at said doubled-back end portion, the needle being included in the wrap and having a hook in which one turn of the string engages, and timed power actuated mechanisms operative in sequence to advance the needle to double back said end portion of the casing, to then actuate the spinner to wrap the string and engage one turn in the needle hook, and thence to retract the needle to pull such one turn through the remainder thereof to complete the knot.

17. A sausage casing tying machine comprising a main frame, sausage casing supporting means mounted on the frame operative to advance the casing through a predetermined longitudinal path and then retract said casing after a predetermined time lag, and a casing tying device mounted on the frame in the path of advancing motion of and in string tying relation to one end portion of a casing; said casing tying device comprising a body having a bore through which said end portion of the casing projects when advanced, means arranged to hold a length of string threaded in intersecting relation to said projecting end portion of the casing, a deflector adjacent said bore operative to bend said projecting end portion of the casing at an angle to the path of its advancing motion, means to place a short length of wire on the casing adjacent the bend line, a needle mounted to advance from a direction opposite said path of advancing motion to engage and double back the inclined end portion of the casing over the string and wire and onto an adjacent part of said casing, a string spinner mounted for rotation about the body and projecting casing, the spinner including an element adapted to engage the string and wrap the same with a number of turns about the casing at said doubled-back end portion, the needle being included in the wrap and having a hook in which one turn of the string engages, and timed power actuated mechanisms operative in sequence to actuate said wire placing means to advance the needle to double back said end portion of the casing, to then actuate the spinner to wrap the string and engage one turn in the needle hook, and thence to retract the needle to pull such one turn through the remainder thereof to complete the knot.

18. A sausage casing tying machine comprising a main frame, sausage casing supporting means mounted on the frame operative to advance the casing through a predetermined longitudinal path and then retract said casing after a predetermined time lag, and a casing tying device mounted on the frame in the path of advancing motion of and in string tying relation to one end portion of a casing; said casing tying device comprising a body having a bore through which said end portion of the casing projects when advanced, means arranged to hold a length of string threaded in intersecting relation to said projecting end portion of the casing, a deflector adjacent said bore operative to bend said projecting end portion of the casing at an angle to the path of its advancing motion, a needle mounted to advance from a direction opposite said path of advancing motion to engage and double back the inclined end portion of the casing over the string and onto an adjacent part of said casing, timed cam actuated means to so advance the needle and then retract the same after a predetermined time lag during which said needle overlies said doubled-back end portion of the casing, a string spinner threaded on the body whereby rotation of said spinner causes axial motion thereof, the spinner including an element to engage the string when the spinner rotates, and timed means to rotate the spinner, after the needle advances, so as to wrap said string in side by side turns about the casing at said doubled-back portion, the needle being included in the wrap and having a hook in which one turn of the string engages, said cam actuated means then acting to retract the needle to pull such one turn through the remainder thereof to complete the knot.

19. A sausage casing tying machine comprising a main frame, sausage casing supporting means mounted on the frame operative to advance the casing through a predetermined longitudinal path and then retract said casing after a predetermined time lag, and a casing tying device mounted on the frame in the path of advancing motion of and in string tying relation to one end portion of a casing; said casing tying device comprising, with a driven shaft, a radial member fixed on the shaft for rotation therewith, the sausage casing supporting and advancing means being mounted to rotate with said radial member, a body mounted on the radial member having a bore parallel to the shaft, the casing when advanced having an end portion projected through said bore, string engaging means on the radial member operative, upon rotation thereof, to pick up a length of string and releasably thread it in intersecting relation to the end portion of a casing projecting from the body, a deflector adjacent said bore operative to bend said projecting end portion of the casing at an angle to the path of its advancing motion, a needle support beyond the body in the direction of said motion and fixed on the shaft for rotation with the radial member and body thereon, a needle slidably mounted on its support to advance from a direction opposite said path of advancing motion of the casing to engage and double back the inclined end portion thereof over the string and onto an adjacent part of said casing, timed cam actuated means responsive to rotation of the needle support arranged to so advance the needle and then retract it after a predetermined time lag during which said needle overlies said doubled back end portion of the casing, a string spinner threaded on the body whereby rotation of the spinner causes axial motion thereof, the spinner including an element to engage the string when the spinner rotates, the spinner including a gear, a fixed gear segment with which said gear engages at a predetermined point after the needle advances and with each revolution of the shaft and radial member so as to rotate the spinner to wrap the string in side by side turns about the casing at said doubled-back portion, the needle being included in the wrap and having a hook in which one turn of the string engages, said cam actuated means then acting to retract the needle to pull such one turn through the remainder thereof to complete the knot, and a coil spring connected to the spinner to rotatably return it to starting position upon escape of its gear from the gear segment.

20. A sausage casing tying machine, as in claim 19, in which said tying device includes a coil of wire mounted for travel with the radial member, a wire feeding mechanism to feed a length of wire from the coil into intersecting relation to said projecting end portion of a casing after bending thereof to an incline but before doubling back thereof by advance of the needle, said wire feeding mechanism including a gear, a gear segment fixed relative to the frame in position to engage and actuate said gear at a predetermined time upon rotation of the shaft and radial member whereby to so feed a length of wire, a reciprocable wire cutter and guide mounted adjacent the body for cooperation with each fed length of wire, and timed means to reciprocate the wire cutter and guide to cut each length of fed wire and to engage it with the inclined end portion of the casing adjacent the line of bend, said timed means including a plunger mounted for rotation with the radial member, and a cam fixed relative to the frame at a point to engage and actuate the plunger after the wire feeding operation, advancing of the needle acting to double back said end portion of the casing over both the string and cut length of wire.

JOEL C. GUNN.

No references cited.